United States Patent Office 2,982,137
Patented May 2, 1961

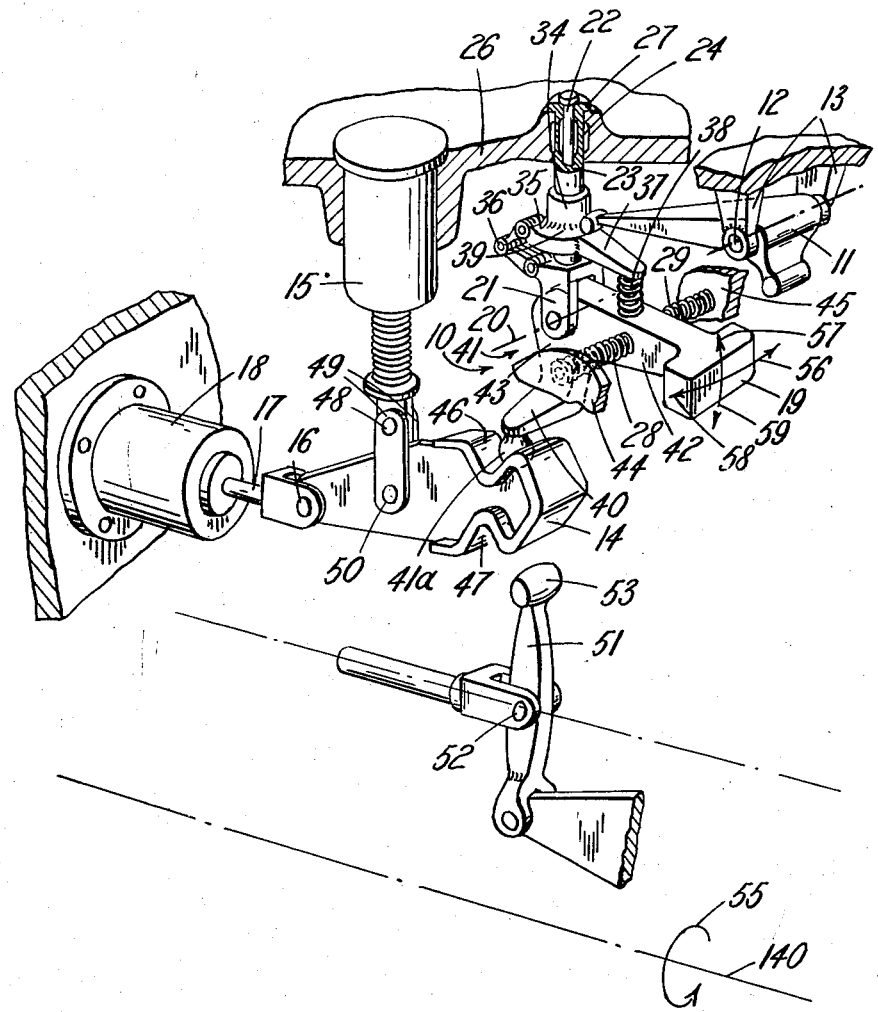

2,982,137
SPEED GOVERNORS
George Orloff, Gloucester, England, assignor to Rotol Limited, Gloucester, England, a British company
Filed Oct. 7, 1957, Ser. No. 688,647
Claims priority, application Great Britain Oct. 11, 1956
4 Claims. (Cl. 73—511)

This invention relates to speed governors and concerns speed governors of the kind, hereinafter referred to as of the kind described, comprising a centrifugal flyweight balanced against a speeder spring the load in which determines the speed datum of the governor, the flyweight being mounted on a rotatable carrier arranged to be driven at the speed of, or a speed directly proportional to, the speed of the rotary system to be governed and controlling the displacement of a control member, movement of which, in either direction from an equilibrium position brings about an adjustment of the load on the rotary system in the sense to correct differences or errors detected by the governor in the speed of the rotary system from the datum speed.

An object of the present invention is to provide a speed governor of the kind described which as well as being responsive to speed errors of the rotary system to be controlled is additionally responsive to the rate of change of speed of the rotary system which brings about the speed error to adjust the load upon the rotary system in the sense to reduce the rate of change of speed.

Another object is to provide a speed governor of the kind described wherein the flyweight is hingedly supported from said carrier in a manner such that at least a component of the inertia force acting on the flyweight during a change of speed of the rotary system, and therefore a change of speed of rotation of said carrier, is available to swing the flyweight relatively to the carrier against the action of spring means to effect a movement of said control member in the direction to reduce the rate of change of speed of the rotary system.

Since upon a change of speed occurring the inertia force acting upon the flyweight is a function of the rate of the speed change it will be seen that movement of the control member effected by the governor in response to the speed change is related to the rate at which the speed change occurs, and this movement is in addition to the movement of the control member effected by the governor in response to any speed error resulting from the speed change. By making the governor responsive to rate of change of speed the governor is able to anticipate a large speed error and perform a correcting action in advance of the large speed error occurring. The speed error is consequently reduced, and the speed held within closer limits. As a result of this, hunting due to speed error is also reduced.

Preferably the flyweight is hinged to a carrier member which is in turn pivotally mounted on the carrier, the pivot axis of the carrier member forming a second hinge axis for the flyweight, one of said hinge axes intersecting the rotational axis of the carrier, and the hinge axes being disposed at right angles to one another in a common plane, spring means being provided resisting hinging movement of the flyweight about said one of said axes, and movement transmission means for transmitting movements of said flyweight about said one of said hinge axes to said control member to move said control member.

Preferably also said spring means tend to maintain the flyweight in a position in which said common plane is normal to the rotational axis of the carrier.

When these preferred features are adapted, upon a change of speed of the rotary system the whole of the inertia force acting on the flyweight is initially available to swing the flyweight relatively to the carrier about said one of said hinge axes against the action of said spring means and the extent of this swinging movement is dependent upon the loading in said spring means which loading is chosen so as to give the governor the required sensitivity to rate of change of speed.

One embodiment of the present invention will now be described merely by way of example, and with reference to the accompanying drawing which is a partial perspective and somewhat diagrammatic view of a speed governor according to the invention.

The speed governor which is about to be described by way of example, is applied to the control of a hydraulic variable pitch aircraft propeller which may be self contained in the sense that all the hydraulic operating controls of the propeller are contained in and rotate with the propeller hub.

Referring to the drawing, the governor, generally indicated at 10, is carried within the propeller hub and is supported from the outer causing 26 of the hub, the outer casing forming a part of the governor in the sense that it constitutes a carrier therefor rotatable about the axis of rotation 140 of the propeller.

Pivoted to the casing 26 so as to lie in a plane normal to the propeller axis 40 is a rod like carrier member 22 which is disposed radially of the casing so that its pivotal axis intersects the axis 40. The rod member 22 is stepped down in diameter at 23 and the shoulder thus formed bears against the lower face of a bush 24 fitted in an aperture in the casing 26. The bush 24 is provided with a flange 27 outside the casing 26, means (not shown) being provided to co-operate with the flange and retain the member 22 and the bush 24 in position.

At its inner radial end the rod member 22 is forked as at 21 and a bell crank lever generally indicated at 41 is hinged between the forks about an axis 20 which lies at right angles to the pivotal axis of the member 22.

One arm 42 of the bell crank lever 41 extends generally parallel with the propeller axis 40 and carries at its free end a flyweight 19 which is integrally formed therewith. The other arm 43 of the bell crank lever 41 extends generally radially inwardly of the casing 26 but is cranked as at 40 so that the end of the arm, which terminates in a ball 41a, is offset from the pivotal axis of the member 22, in the direction of the axis 20.

The larger diameter part of the rod member 22 carries a sleeve 34 which is slidable thereon. The sleeve 34 has a flange 35 at its inner radial end which is connected by means of a scissors linkage 36 to the forked end 21 of the member 22 so that the sleeve 34 is free to slide on the rod member 22 and yet is displaced angularly with the rod member when the rod member is turned about its pivotal axis. A projection 37 on the flange 35 lies radially outwardly of the arm 42 of the bell crank lever 41 and an open coiled spring 38 which acts as the governor speeder spring is interposed between the projection 37 and the arm, 42, the ends of the spring 38 being housed in cylindrical recesses in the arm and the projection respectively with the spring lying generally parallel to the rod member 22.

The flange 35 is radiused into the sleeve 34 as at 39 and the radius 39 is engaged by the free end of an arm of a bell crank lever 11 hinged at 12 between a pair of lugs 13 formed integrally with the casing 26. The other arm of the bell crank lever 11 is connected to operating linkage (not shown) for adjusting the loading on the speeder spring 38. When the bell crank lever 11 is moved about its pivot axis 12 the sleeve 34 is displaced on the member 22 to alter the loading in the spring 38.

To resist swinging movement of the flyweight 19 about its hinge axis provided by the pivotal axis of the member 22, two coil springs 28 and 29 are disposed one on either side of the arm 42 of the bell crank lever 41, the springs 28 and 29 being engaged between the arm 42 and fixed abutments 44 and 45 respectively carried from the casing 26, the springs 28 and 29 being disposed at right angles to and in the same plane as the spring 38. The springs 28 and 29 have their ends received in cylindrical recesses in the arm 42 and the abutments 44 and 45. In order to damp swinging movements of the flyweight about the axis of the rod member 22 damping means such as a dash pot having its piston connected to the arm 42 may be provided if desired.

Generally indicated at 18 is a control member in the form of an hydraulic spool valve which controls an hydraulic motor, operation of which adjusts the pitch of the propeller. The valve 18 may be of any known or convenient construction.

It will be understood that when the valve 18 is in its equilibrium position the pitch change motor remains inoperative, but when the valve is displaced in either direction from the equilibrium position hydraulic fluid is supplied to the pitch change motor to adjust the pitch of the propeller blades, in one direction to coarsen the pitch of the blades and in the other direction to move the blades towards fine pitch.

The stem 17 of the control valve 18 is hinged as at 16 to a link in the form of a latch member 14. Towards its free end the latch member 14 has, on opposite sides, a pair of open ended generally V-sectioned grooves 46 and 47 and in one position of the latch member the ball end 41a is engaged in the groove 46.

A solenoid 15 mounted on the casing 26 has its armature hingeably connected as at 48 to a pair of links 49 in turn hinged to the latch member 14 as at 50 at a point between its ends. On the side of the latch member 14 remote from the ball end 41 there is provided, carried from the casing 26, a double armed lever 51 pivoted as at 52; this constituting part of an alternative control linkage for the valve 18. One arm of the lever 51 extends towards the latch member 14 and terminates in a ball end 53. When the solenoid 15 is energised the latch member 14 is swung about its hinge 16 and the ball end 53 enters the groove 47 on the latch member, the groove 46 disengaging the ball end 41a. The other arm of the lever 51 is connected to a control, movement of which, when the solenoid 15 is de-energised, adjusts the valve 18 to alter the pitch of the propeller.

When the solenoid 15 is de-energised therefore it will be seen that the governor 41 is disconnected from the valve 18 and the control of the valve 18 handed over to the alternative control linkage which may, for example, be for manually or automatically feathering the propeller, for automatically coarsening the pitch of the propeller in the event of the failure of a fine pitch stop on the propeller, or again to enable a reversible pitch propeller to be adjusted into reverse pitch.

The speed governor 41 has been described, and is shown in the drawing, with the various moving parts of the governor in the positions which they assume when the propeller is in an "on speed" condition, and the governor is in equilibrium. In these circumstances the control valve 18 is maintained in its equilibrium position and the pitch change motor of the propeller remains unactuated.

In the equilibrium condition of the governor the hinge axes about which the flyweight 19 is free to move, that is to say the hinge axis represented by the pivot axis of the member 22, and the hinge axis 20, lie in a plane normal to the axis 40, the hinge axes being maintained in this plane by the springs 28 and 29 which are of equal power and rate, and equally loaded when the propeller is rotating at a constant speed.

When the propeller deviates from an "on speed" condition the centrifugal force acting on the flyweight 19 changes, and as a result of this the flyweight swings about its hinge axis 20, and moves the ball end 41a along an arc centred on the axis 20, this movement being transmitted to the latch member 14 which in turn displaces the valve 18 from its equilibrium position to adjust the pitch of the propeller blades in the sense to return the propeller to its "on speed" condition in well known manner.

If the speed deviation is accompanied by a sufficient rate of change of speed, as determined by the power of the springs 28 and 29, the resulting inertia force acting on the flyweight 19 swings the flyweight about the pivot axis of the member 22 and thereby displaces the ball end 41A about the pivot axis of the member 22. This movement is transmitted to the latch member 14 which in turn displaces the valve 18.

In the example being described, the propeller rotates in the direction indicated by the arrow 55. Upon an increase in speed of the propeller at a rate sufficient to swing the flyweight about the pivot axis of the member 22 therefore, the flyweight, under the action of the resulting inertia force, the whole of which, in the example being described is available to move the flyweight from its equilibrium position, moves in the direction of the arrow 56, and, under the action of the unbalanced centrifugal force, in the direction of the arrow 57. As will be seen from the drawing both these movements act to displace the latch member 14 to the right in the drawing, from its equilibrium position as drawn. Displacement of the latch member to the right in the drawing is arranged to displace the valve 18 to actuate the pitch change motor in the sense to increase the pitch of the blades and thereby the load on the engine driving the propeller. This has the effect not only of reducing the propeller speed but also the rate at which the propeller speed is initially changing, and adjustment of the propeller pitch continues until the propeller again settles down to the "on speed" condition.

When the propeller is in an "on speed" condition and a decrease in speed of the propeller occurs at a rate sufficient to swing the flyweight about the pivot axis of the member 22, the flyweight moves, under the action of the inertia force, in the direction of the arrow 58 and under the action of the unbalanced load in the speeder spring 38, in the direction of the arrow 59. These movements have the effect of displacing the latch member 14 to the left in the drawing with the result that the valve 18 is adjusted to actuate the pitch change motor to decrease the pitch of the blades and therefore the load on the engine driving the propeller. This has the effect of increasing the propeller speed but again reducing the rate at which the propeller speed is initially changing, and adjustment of the propeller pitch continues until the propeller again settles down to the "on speed" condition.

It will be appreciated that movements of the flyweight about both the hinge axes may take place at the same time and that these movements are combined by the movement transmission means represented by the arm 43, the ball end 41a and the latch member 14, and applied to displace the valve 18 by an amount which is the sum of the displacements due to the hinging movements taken individually.

It will also be appreciated that when a speed deviation occurs, especially if the deviation is sudden, the rate of speed change will tend to be greatest when the speed error is smallest. In the result therefore under such circumstances, circumstances which, due to the relatively slow follow up of pitch change, would result in a large speed error occurring, the immediate response of the governor to the speed change in the sense to reduce it has the effect of "anticipating" the large speed error and thereby reducing the speed error which does in fact occur. By reducing the speed error which occurs, hunting of that part of the governing system responsive to speed error is also reduced and as a consequence the governor may be designed so that the propeller is returned to its "on speed" condition more quickly both by adjusting the sensitivity of the governor to rate of change of speed and by damping that part of the governor which is responsive to rate of change of speed for example by means of the dash pot previously described. When a speed deviation occurs resulting in small rates of change of speed the part of the governor responsive to rate of change of speed remains inoperative and the governor functions solely in the manner of the conventional constant speed unit.

I claim:

1. A speed governor comprising a carrier rotatable about a rotational axis, a rod member carried by said carrier to pivot about a first hinge axis which intersects said rotational axis, a bell crank lever carried intermediate its length by said rod member to pivot about a second hinge axis which is disposed at right angles to the first hinge axis, a flyweight carried by one arm of said bell crank lever, the other arm of said bell crank lever being cranked so that the end of said other arm is off-set from the first hinge axis in the direction of the second hinge axis, and said cranked arm being used to transmit to a control member movements of said flyweight about both said hinge axes.

2. A speed governor as claimed in claim 1, comprising a speeder spring, and a sleeve slidable axially on said rod member but fixed against rotation relatively thereto, said sleeve carrying an abutment for said speeder spring and being slidable on said rod to vary the loading in the speeder spring.

3. A speed governor as claimed in claim 1, wherein said control member is carried for rotation with said carrier, and said movement transmission means further comprises a link connecting said control member with the off-set end of said other arm of said bell crank lever.

4. A speed governor as claimed in claim 3, wherein said link is in the form of a latch member hinged to said control member, and means is provided for swinging said latch member about its hinged connection with the control member to disengage the latch member from said other arm of said bell crank lever, and to engage said latch member with alternative control linkage for said control member, and vice versa.

References Cited in the file of this patent

UNITED STATES PATENTS

| 59,411 | Knight | Nov. 6, 1866 |
| 821,286 | Grant | May 22, 1906 |
| 1,149,898 | Cummins | Aug. 10, 1915 |
| 2,175,837 | Hanna | Oct. 10, 1939 |
| 2,326,308 | Reissner | Aug. 10, 1943 |
| 2,376,844 | Ziebolz | May 22, 1945 |
| 2,390,084 | Edwards | Dec. 4, 1945 |
| 2,715,528 | Schulte | Aug. 16, 1955 |
| 2,815,082 | Kessler | Dec. 3, 1957 |

FOREIGN PATENTS

| 654,089 | Great Britain | June 6, 1951 |